United States Patent
Zeng

(10) Patent No.: US 11,157,389 B1
(45) Date of Patent: Oct. 26, 2021

(54) METHOD FOR DETECTING MEMORY LEAK BASED ON LINUX KERNEL

(71) Applicant: AMLOGIC (SHANGHAI) CO., LTD., Shanghai (CN)

(72) Inventor: Tao Zeng, Shanghai (CN)

(73) Assignee: AMLOGIC (SHANGHAI) CO., LTD., Shanghai (CN)

(*) Notice: Subject to any disclaimer, the term of this patent is extended or adjusted under 35 U.S.C. 154(b) by 70 days.

(21) Appl. No.: 16/325,175

(22) PCT Filed: Sep. 27, 2018

(86) PCT No.: PCT/CN2018/108103
§ 371 (c)(1),
(2) Date: Feb. 12, 2019

(87) PCT Pub. No.: WO2019/091244
PCT Pub. Date: May 16, 2019

(30) Foreign Application Priority Data

Nov. 7, 2017 (CN) .......................... 201711085297.6

(51) Int. Cl.
*G06F 11/36* (2006.01)
*G06F 9/50* (2006.01)

(52) U.S. Cl.
CPC .......... *G06F 11/366* (2013.01); *G06F 9/5016* (2013.01)

(58) Field of Classification Search
None
See application file for complete search history.

(56) References Cited

U.S. PATENT DOCUMENTS

| 7,293,142 B1* | 11/2007 | Xu ................ G06F 11/3648 707/999.202 |
| 8,954,695 B1* | 2/2015 | Thathapudi ........... G06F 12/145 711/163 |
| 2005/0028140 A1* | 2/2005 | Ayachitula ............ G06F 9/5022 717/116 |

(Continued)

FOREIGN PATENT DOCUMENTS

| CN | 102819497 A | 12/2012 |
| CN | 102866947 A | 1/2013 |

(Continued)

*Primary Examiner* — Qing Chen
(74) *Attorney, Agent, or Firm* — SoCal IP Law Group LLP; Mark Andrew Goldstein

(57) ABSTRACT

A method for detecting a memory leak based on Linux kernel, applied to an detection of the memory leak, comprises: reading a node, acquiring the return addresses of the allocation functions of each of the plurality of memory pages and the number of the memory pages thereof; releasing the return addresses of the allocation functions and the number of the memory pages counted by the node; reading the node again, acquiring the return address of each of the allocation functions and the number of the memory pages thereof; comparing the number in each case to calculate a difference value, if the difference value is a positive value and monotonically increases, it's determined that the memory leak occurs in the memory pages allocated correspondingly by the allocation functions. During the detection of the memory leak, the detection method consumes less memory without affecting the efficiency in allocating and releasing the memory.

8 Claims, 4 Drawing Sheets

(56) References Cited

U.S. PATENT DOCUMENTS

| | | | | |
|---|---|---|---|---|
| 2005/0235127 A1* | 10/2005 | Muthiah | ............. | G06F 11/3648 |
| | | | | 711/170 |
| 2006/0143537 A1* | 6/2006 | Grey | ................... | G06F 11/3688 |
| | | | | 714/38.14 |
| 2008/0294936 A1* | 11/2008 | Hogstrom | ............. | G06F 11/366 |
| | | | | 714/6.13 |
| 2013/0205113 A1* | 8/2013 | Ahmad | ................. | G06F 9/5016 |
| | | | | 711/170 |
| 2014/0189438 A1 | 7/2014 | Arbel et al. | | |

FOREIGN PATENT DOCUMENTS

| | | |
|---|---|---|
| CN | 106407031 A | 2/2017 |
| CN | 107220181 A | 9/2017 |

\* cited by examiner

METHOD FOR DETECTING MEMORY LEAK BASED ON LINUX KERNEL

RELATED APPLICATION INFORMATION

This patent claims priority from International PCT Patent Application No. PCT/CN2018/108103, filed Sep. 27, 2018 entitled, METHOD FOR DETECTING MEMORY LEAK BASED ON LINUX KERNEL, which claims priority to Chinese Application No. 201711085297.6, filed Nov. 7, 2017 entitled, METHOD FOR DETECTING MEMORY LEAK BASED ON LINUX KERNEL, all of which are incorporated herein by reference in their entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND OF THE INVENTION

1. Field of the Invention

The invention relates to the field of communication technologies, and more particularly, to a method for detecting a memory leak based on Linux kernel.

2. Description of the Related Art

A memory leak refers to a situation where a heap memory in an application program having been dynamically allocated is not released or cannot be released for some reasons, resulting in a waste of system memory, thus, the application slows down, or even the system crashes and other serious consequences. In the existing Linux system, the detection of the memory leak is specifically performed through the default memleak detection technology of Kernel. After executing the memleak detection method, the Kernel will track its pointer at the return of the functions such as kmalloc, vmalloc, kmem_cache_alloc, etc., then the pointer, together with its size and stack trace information, will be stored in PRIO search tree. When the memory is released by the Kernel, the stored trace information will be deleted by kmemleak_free. The Kernel will initiate a kernel thread of kmemleak_s, periodically scanning the stored object information, and then determining whether the object is referenced to determine if there is a memory leak. However, problems listed as follows exist in the above-mentioned memleak technology. A periodical scanning is required during the detection process, which would increase the CPU consumption burden; when the memory is allocated and released, the slab allocation is performed again so as to record the information of the memory object, which would prolong the time for the memory to be allocated and released, thereby reducing the efficiency of the system.

SUMMARY OF THE INVENTION

In view of the above-mentioned problems occurring in the detection of a memory leak in the prior art, the present invention intends to provide a method for detecting a memory leak based on Linux kernel, which has the advantages of occupying less memory without affecting the efficiency in allocating and releasing the memory.

The technical solutions are as follows:

A method for detecting a memory leak based on Linux kernel, applied to an detection of the memory leak, wherein the memory comprises a plurality of memory pages, wherein a node is created through which return addresses of allocation functions to be called in each of the plurality of memory pages and the number of the memory pages allocated by each of the allocation functions are counted; wherein the method comprises steps of:

Step S1, reading the node, acquiring the return addresses of the allocation functions of each of the plurality of memory pages and the number of the memory pages which are allocated correspondingly by the allocation functions;

Step S2, after reading of the node, releasing the return addresses of the allocation functions and the number of the memory pages which are allocated correspondingly by the allocation functions counted by the node;

Step S3, reading the node again, acquiring the return address of each of the allocation functions and the number of the memory pages which are allocated correspondingly by the allocation functions;

Step S4, acquiring the number of the memory pages allocated respectively and correspondingly by the identical allocation function in Step S3 and Step S1, and comparing the number in each case to calculate a difference value; if the difference value is a positive value and it monotonically increases, it is determined that the memory leak occurs in the memory pages allocated correspondingly by the allocation functions.

Preferably, each of the plurality of memory pages comprises a data structure, and an address return identifier, an allocation order flag and a memory type allocation identifier are added to the data structure; wherein the address return identifier is configured for recording an address of a calling function when the memory is allocated; and the allocation identifier is configured for indicating the memory type allocated to the plurality of memory pages.

Preferably, when the calling function information is saved each time when the memory allocation is performed, a function calling chain is checked by a kernel stack, and common allocation functions, return addresses, allocation parameters and allocation orders corresponding to the common allocation functions are sequentially saved in the calling chain; acquiring the return addresses, the allocation parameters and the allocation orders corresponding to the allocation functions on top of the calling chain; saving the return addresses to the address return identifier, and saving the allocation parameters and the allocation orders to the data structures of the plurality of memory pages.

Preferably, the memory comprises a plurality of memory areas, each of the plurality of memory areas is formed by the plurality of memory pages, and a method for acquiring the allocation function of each of the plurality of memory pages comprises following steps of:

Step A1, reading each of the plurality of memory areas in sequence;

Step A2, reading the data structure corresponding to the each of the plurality of memory pages in each of the plurality of memory areas so as to acquire the return address of the allocation function corresponding to each of the plurality of memory pages; and Step A3, after reading of all the plurality of memory areas and the plurality of memory pages in each of the plurality of memory areas, the acquired return addresses corresponding to the plurality of allocation functions and the number of the memory page allocated by each of the allocation function together form a temporary array.

Preferably, a printing module is provided, and each of the allocation functions, the return address corresponding to each of the allocation functions and the number of the memory pages allocated correspondingly by the allocation functions, all of which are saved in the temporary array, are printed and displayed in an interface by the printing module.

Preferably, in Step A2, a temporary recording array is provided for storing the return address of the allocation function corresponding to the read memory page;

Step A2 further comprises following steps of:

Step A21: determining whether all the plurality of memory pages are read;

If the result shows "YES", it means that all the plurality of memory pages are read, then exiting;

Step A22: when the next memory page is read, the return address corresponding to the read allocation function is matched with the return address in the temporary recording array;

Step A23, if the return address corresponding to the read allocation function is the same with the return address in the temporary recording array, the number of the memory pages allocated to the current allocation function is increased by 1, and returning to Step A21; and Step A24: if the return address corresponding to the read allocation function is not the same with the return address in the temporary recording array, saving the return address of the allocation function corresponding to the memory page to the temporary recording array, and returning to Step A21.

Preferably, when the plurality of memory pages are released, the return addresses saved in the address return identifier, the allocation parameters and the allocation orders saved in the data structure are cleared.

Preferably, a macro configuration module is provided for forming the address return identifier by configuration.

The above-mentioned technical solutions have the following beneficial effects. During the detection of the memory leak, the detection method consumes less memory without affecting the efficiency in allocating and releasing the memory. In addition, the present invention overcomes the above-mentioned problems that a periodical scanning is required during the detection process performed through the default memleak detection technology of Kernel, which increases the CPU consumption burden; when the memory is allocated and released, the slab allocation is performed again to record the information of the memory object, which prolongs the time for the memory to be allocated and released, thereby reducing the efficiency of the system.

BRIEF DESCRIPTION OF THE DRAWINGS

The accompanying drawings, together with the specification, illustrate exemplary embodiments of the present disclosure, and, together with the description, serve to explain the principles of the present invention.

DETAILED DESCRIPTION

Figure 1:
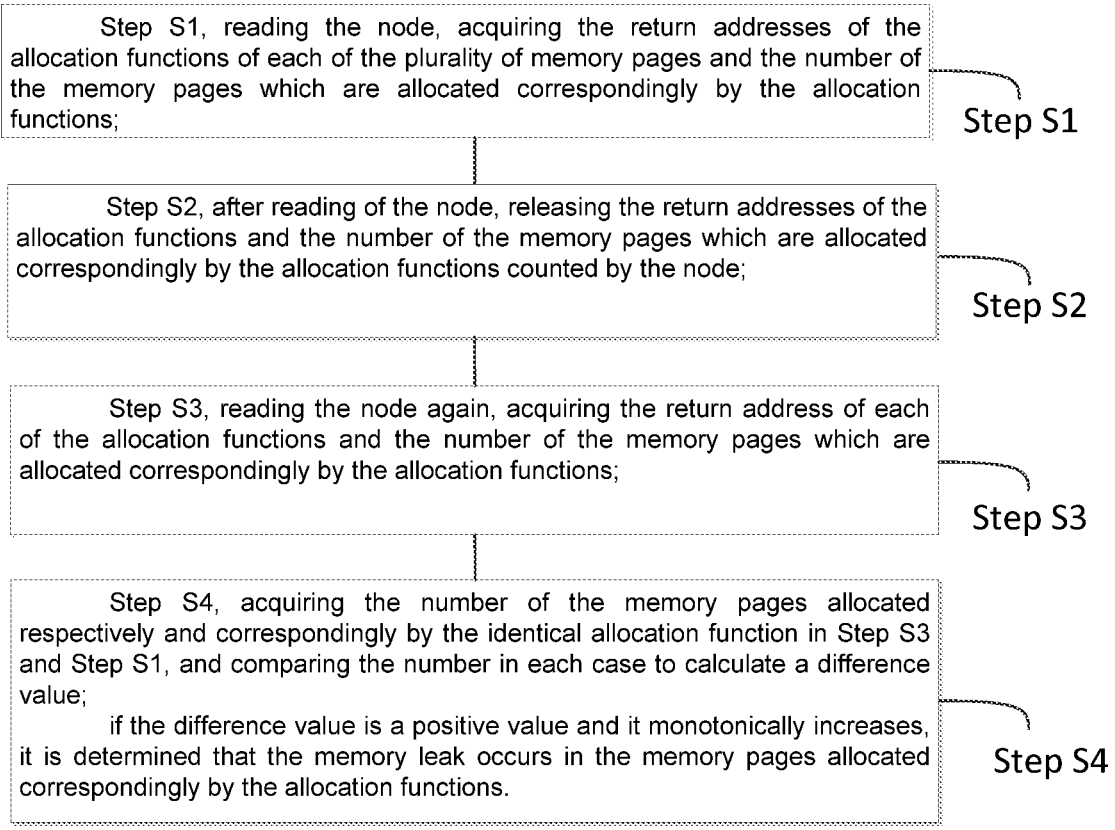
FIG. 1 is a flowchart of a method for detecting a memory leak based on Linux kernel according to an embodiment of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

Hereinafter, certain exemplary embodiments according to the present disclosure will be described with reference to the accompanying drawings.

The technical solutions set forth in the present invention comprise a method for detecting a memory leak based on Linux kernel.

An embodiment of a method for detecting a memory leak based on Linux kernel, applied to an detection of the memory leak, wherein the memory comprises a plurality of memory pages, wherein a node is created through which return addresses of allocation functions to be called in each of the plurality of memory pages and the number of the memory page allocated by each of the allocation functions are counted; as shown in FIG. 1, the method comprises steps of:

Step S1, reading the node, acquiring the return addresses of the allocation functions of each of the plurality of memory pages and the number of the memory pages which are allocated correspondingly by the allocation functions;

Step S2, after reading of the node, releasing the return addresses of the allocation functions counted by the nodes and the number of the memory pages which are allocated correspondingly by the allocation functions;

Step S3, reading the node again, acquiring the return address of each of the allocation functions and the number of the memory pages which are allocated correspondingly by the allocation functions;

Step S4, acquiring the number of the memory pages allocated respectively and correspondingly by the identical allocation function in Step S3 and Step S1, and comparing the number in each case to calculate a difference value; if the difference value is a positive value and it monotonically increases, it is determined that the memory leak occurs in the memory pages allocated correspondingly by the allocation functions.

For the existing Linux system, a periodical scanning is required during the detection process performed through the default memleak detection technology of Kernel, which would increase the CPU consumption burden; when the memory is allocated and released, the slab allocation is performed again to record the information of the memory object, which would prolong the time for the memory to be allocated and released, thereby reducing the efficiency of the system; and when the kernel allocates more objects, the slab of the kmemcache would consume a lot of memories; take a typical 2 GB Android platform as an example, if you open the kmemleak configuration, the kmemleak slab will consume about 82 MB of memory after the boot is started, which is obviously a great waste.

In the present invention, a created node acquires the return addresses of the allocation functions of each of the plurality of memory pages and the number of the memory pages which are allocated correspondingly by the allocation functions. It is assumed here that the acquired allocation functions are A1, A2, A3 and A4, and that the number of the memory pages corresponding to the functions A1, A2, A3 and A4 are 100, 200, 300 and 400, respectively.

After releasing the return addresses of the allocation functions and the number of the memory pages which are allocated correspondingly by the allocation functions counted by the node, reading the node again, and counting the acquired allocation functions and the number of the memory pages which are allocated correspondingly by the allocation functions. It is assumed here that the acquired allocation functions are A1, A2, A3 and A4, and that the number of the memory pages corresponding to the functions A1, A2, A3 and A4 are 300, 400, 500 and 600, respectively.

Comparing the allocation function A1 acquired currently to the allocation function A1 acquired previously to calculate a difference value. If the difference value is greater than 0 and monotonically increases, it means that a memory leak occurs in the memory page allocated correspondingly by the current allocation function; if the difference value is equal to or less than 0, and it always tend to be very small, it means that the memory page allocated correspondingly by the current allocation function is normal.

Figure 4:
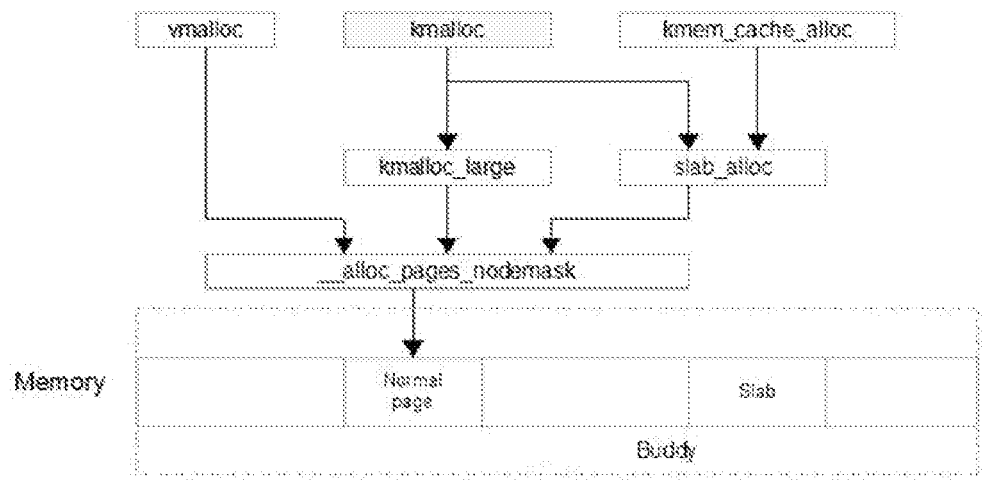
FIG. 4 is a calling graph showing the kernel memory allocates API in a method for detecting a memory leak based on Linux kernel according to an embodiment of the present invention.

In a preferred embodiment, as shown in FIG. 4, each of the plurality of memory pages comprises a data structure, and an address return identifier represented by _ret_ip, an allocation order flag and a memory type allocation identifier represented by alloc_mask are added to the data structure, wherein the address return identifier is configured for recording an address of a calling function when the memory is allocated, the name of the calling function can be used to confirm the identity information of a memory allocator, and the allocation identifier is configured for indicating the memory type allocated to the plurality of memory pages.

In the above-mentioned technical solution, for the address return identifier and the memory type allocation identifier added to the data structure (struct pag structure) in each of the plurality of memory pages, only one long and int type member is added, and 12 bytes are added to a 64-bit system, and only 6 MB of memory are added to a specific 2 GB of memory system. Compared with the increase of 82 MB of slab data of kmemleak, the memory consumption is greatly reduced.

In a preferred embodiment, when the calling function information is saved each time when the memory allocation is performed, a function calling chain is checked by a kernel stack, and common allocation functions, return addresses, allocation parameters and allocation orders corresponding to the common allocation functions are sequentially saved in the calling chain; acquiring the return addresses, the allocation parameters and the allocation orders corresponding to the allocation functions on top of the calling chain; saving the return addresses to the address return identifier, and saving the allocation parameters and the allocation orders to the data structures of the plurality of memory pages.

In the above-mentioned technical solution, the allocation orders comprises the number of the memory pages to be allocated by each of the allocation functions, which is usually represented by $2^k$, and the size of each of the plurality of memory pages is 4 KB, and the allocation parameters comprises the type of the memory allocated by the current allocation parameter.

Figure 2:
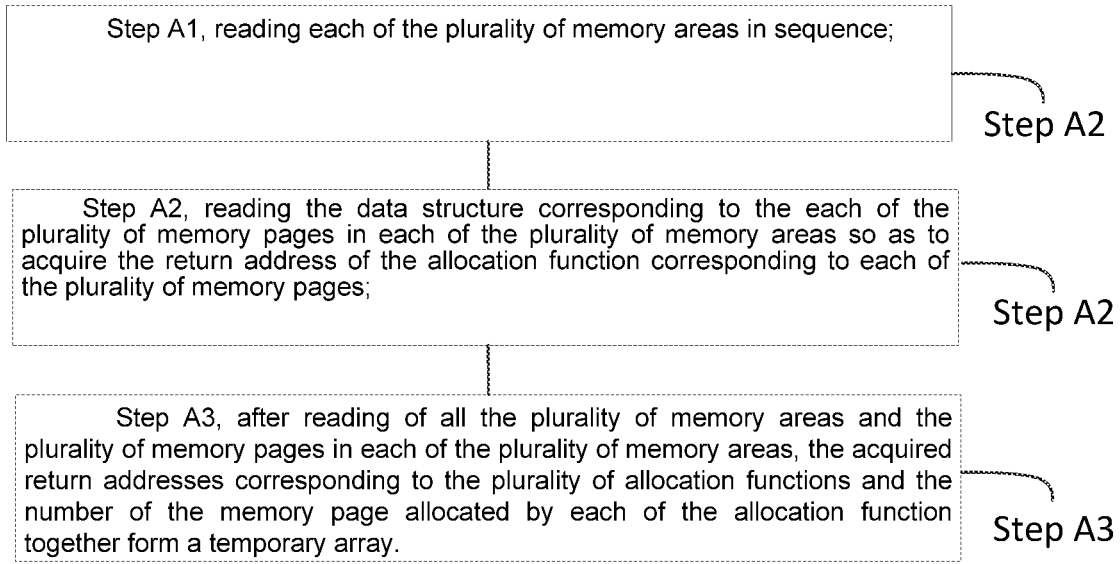
FIG. 2 is a flowchart of a method for obtaining the allocation function of each of the plurality of memory pages in a method for detecting a memory leak based on Linux kernel according to an embodiment of the present invention.

In a preferred embodiment, the memory comprises a plurality of memory areas, each of the plurality of memory areas is formed by the plurality of memory pages, and as shown in FIG. 2, a method for acquiring the allocation functions of each of the plurality of memory pages comprises following steps of:

Step A1, reading each of the plurality of memory areas in sequence;

Step A2, reading the data structure corresponding to the each of the plurality of memory pages in each of the plurality of memory areas so as to acquire the return address of the allocation function corresponding to each of the plurality of memory pages; and Step A3, after reading of all the plurality of memory areas and the plurality of memory pages in each of the plurality of memory areas, the acquired return addresses corresponding to the plurality of allocation functions and the number of the memory page allocated by each of the allocation function together form a temporary array.

In a preferred embodiment, a printing module is provided, and each of the allocation functions, the return address corresponding to each of the allocation functions and the number of the memory pages allocated correspondingly by the allocation functions, all of which are saved in the temporary array, are printed and displayed in an interface by the printing module.

Figure 3:
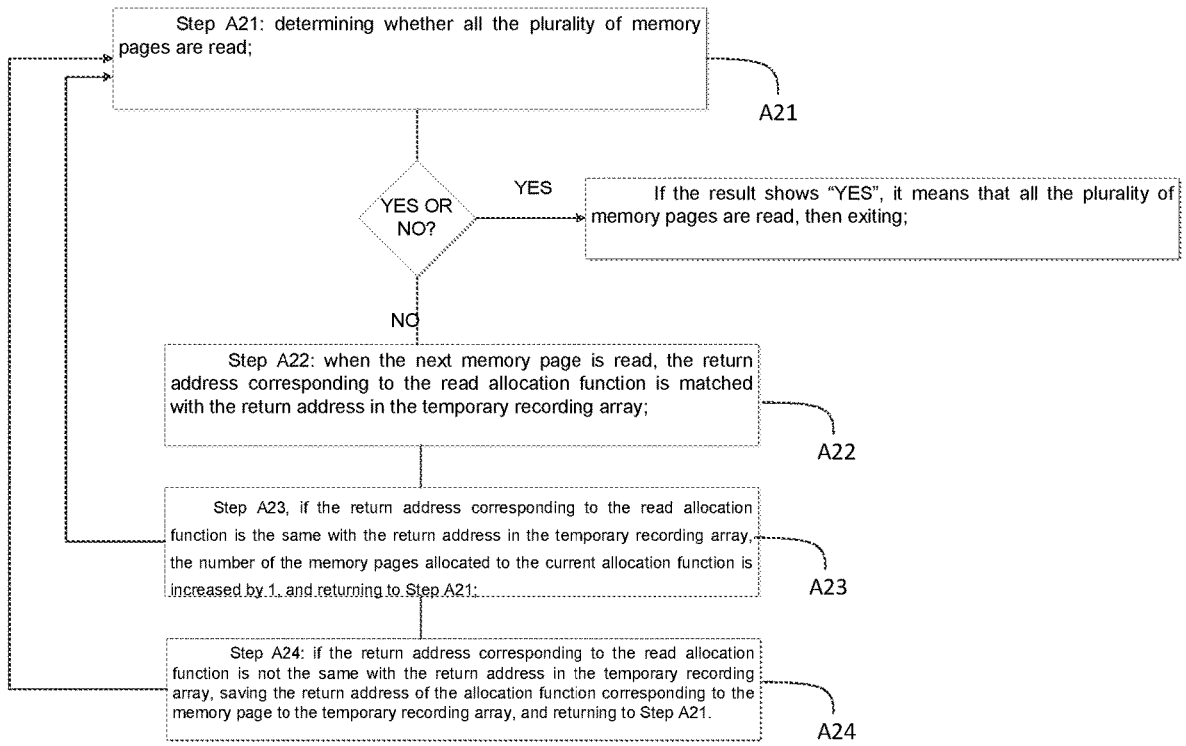
FIG. 3 is a flowchart of a method for obtaining the allocation function of each of the plurality of memory pages in a method for detecting a memory leak based on Linux kernel according to an embodiment of the present invention.

In a preferred embodiment, a temporary recording array is provided for storing the return address of the allocation function corresponding to the read memory page; as shown in FIG. 3, Step A2 further comprises following steps of:

Step A21: determining whether all the plurality of memory pages in the current memory area are read;

If the result shows "YES", it means that all the plurality of memory pages are read, then exiting;

Step A22: when the next memory page is read, the return address corresponding to the read allocation function is matched with the return address in the temporary recording array;

Step A23, if the return address corresponding to the read allocation function is the same with the return address in the temporary recording array, the number of the memory pages allocated to the current allocation function is increased by 1, and returning to Step A21; and Step A24: if the return address corresponding to the read allocation function is not the same with the return address in the temporary recording array, saving the return address of the allocation function corresponding to the memory page to the temporary recording array, and returning to Step A21.

In the above-mentioned technical solution, each of the plurality of memory areas is represented by a zone, and the plurality of memory pages are stored in the zone, and each of the plurality of memory pages comprises a struct pag structure. When reading the memory area, by starting from the start_pfn to end_pfn of the zone, acquiring the struct page structure of the memory page according to pfn; then finding _ret_ip (the return address corresponding to the allocation function) from the struct page structure, and looking up in an array which temporarily records ret_ip according to _ret_ip.

If no match is made, it means that this is a new _ret_ip, then recording it and increasing its allocation based on the allocation order of this page. All the pages and zones are subjected to the above-mentioned operation in the sequence listed above.

A _ret_ip that records the return address of all the allocators and a temporary array of the total number of allocations can be obtained. Finally, printing out the _ret_ip and the temporary array, and completing reading the node (/proc/pagetrace).

In a preferred embodiment, when the plurality of memory pages are released, the return addresses saved in the address return identifier, the allocation parameters and the allocation orders saved in the data structure are cleared.

In the above-mentioned technical solution, when the memory allocated by the allocation function is released, if the return addresses saved in the address return identifier, the allocation parameters and the allocation orders saved in the allocation identifier are cleared, it means that the current memory page is released and is not called by the allocation function.

In a preferred embodiment, a macro configuration module is provided for forming the address return identifier by configuration.

In the above-mentioned technical solution, when operating under the Linux, the return address of the function supported by the compiler can be obtained through the macro configuration module (i.e, the macro _RET_IP_), that is to say, the caller of the _alloc_pages_nodemask function is obtained.

The above descriptions are only the preferred embodiments of the invention, not thus limiting the embodiments and scope of the invention. Those skilled in the art should be able to realize that the schemes obtained from the content of specification and drawings of the invention are within the scope of the invention.

It is claimed:

1. A method for detecting a memory leak based on Linux kernel, applied to an detection of the memory leak, wherein a memory comprises a plurality of memory pages, and wherein a node is created through which return addresses of a plurality of allocation functions to be called in each memory page of the plurality of memory pages and a number of the plurality of memory pages allocated by each allocation function of the plurality of allocation functions are counted;

wherein the method comprises steps of:

Step S1: reading the node, acquiring the return addresses of the plurality of allocation functions of each memory page of the plurality of memory pages and the number of the plurality of memory pages which are allocated correspondingly by the plurality of allocation functions;

Step S2: after reading of the node, releasing the return addresses of the plurality of allocation functions counted by the node and the number of the plurality of memory pages which are allocated correspondingly by the plurality of allocation functions;

Step S3: reading the node again, acquiring a return address of each allocation function of the plurality of allocation functions and the number of the plurality of memory pages which are allocated correspondingly by the plurality of allocation functions; and Step S4: acquiring the number of the plurality of memory pages allocated respectively and correspondingly by an identical allocation function in Step S3 and Step S1, and comparing the number of the memory pages allocated respectively and correspondingly by the identical allocation function in Step S3 and Step S1 to calculate a difference value;

if the difference value is a positive value and the difference value monotonically increases, the memory leak is determined to occur in the memory pages which are allocated correspondingly by the plurality of allocation functions, wherein during the detection of the memory leak based on Linux kernel, less memory is consumed without affecting an efficiency in allocating and releasing the memory.

2. The method for detecting a memory leak based on Linux kernel as claimed in claim 1, wherein each memory page of the plurality of memory pages comprises a data structure, and wherein an address return identifier, an allocation order flag, and a memory type allocation identifier are added to the data structure;

wherein the address return identifier is configured to record an address of a calling function when the memory is allocated; and wherein the memory type allocation identifier is configured to indicate a memory type allocated to the plurality of memory pages.

3. The method for detecting a memory leak based on Linux kernel as claimed in claim 2, wherein when the address of the calling function is saved each time when the memory allocation is performed, a function calling chain is checked by a kernel stack, and common allocation functions, return addresses, allocation parameters, and allocation orders corresponding to the common allocation functions are sequentially saved in the function calling chain;

acquiring the return addresses, the allocation parameters, and the allocation orders corresponding to the common allocation functions on top of the function calling chain;

saving the return addresses to the address return identifier, and saving the allocation parameters and the allocation orders corresponding to the common allocation functions to the data structures of the plurality of memory pages.

4. The method for detecting a memory leak based on Linux kernel as claimed in claim 3, wherein when the plurality of memory pages are released, the return addresses saved in the address return identifier, and the allocation parameters and the allocation orders corresponding to the common allocation functions saved in the data structures of the plurality of memory pages are cleared.

5. The method for detecting a memory leak based on Linux kernel as claimed in claim 2, wherein the memory comprises a plurality of memory areas, and wherein each memory area of the plurality of memory areas is formed by the plurality of memory pages, and a method for acquiring the allocation function of each memory page of the plurality of memory pages comprises steps of:
  Step A1: reading each memory area of the plurality of memory areas in sequence;
  Step A2: reading the data structure corresponding to each memory page of the plurality of memory pages in each memory area of the plurality of memory areas so as to acquire the return address of the allocation function corresponding to each memory page of the plurality of memory pages; and
  Step A3: after reading of all the plurality of memory areas and the plurality of memory pages in each memory area of the plurality of memory areas, the acquired return addresses corresponding to the plurality of allocation functions and the number of the plurality of memory pages allocated by each allocation function of the plurality of allocation functions together form a temporary array.

6. The method for detecting a memory leak based on Linux kernel as claimed in claim 5, wherein a printing module is provided, and each allocation function of the plurality of allocation functions, the acquired return address corresponding to each allocation function of the plurality of allocation functions and the number of the plurality of memory pages allocated correspondingly by the plurality of allocation functions, all of which are saved in the temporary array, and are printed and displayed in an interface by the printing module.

7. The method for detecting a memory leak based on Linux kernel as claimed in claim 5, wherein a temporary recording array is provided to store the acquired return address of the allocation function corresponding to the memory page of the plurality of memory pages;
  wherein Step A2 further comprises steps of:
  Step A21: determining whether all the plurality of memory pages are read;
  If the result shows "YES", it means that all the plurality of memory pages are read, then exiting;
  Step A22: when a next memory page of the plurality of memory pages is read, a return address corresponding to a read allocation function is matched with the acquired return address stored in the temporary recording array;
  Step A23: if the return address corresponding to the read allocation function is the same as the acquired return address stored in the temporary recording array, a number of the plurality of memory pages allocated to a current allocation function is increased by 1, and returning to Step A21; and
  Step A24: if the return address corresponding to the read allocation function is not the same as the acquired return address stored in the temporary recording array, saving the return address corresponding to the read allocation function to the temporary recording array, and returning to Step A21.

8. The method for detecting a memory leak based on Linux kernel as claimed in claim 2, wherein a macro configuration module is provided to form the address return identifier by configuration.

* * * * *